United States Patent
Zhang et al.

(10) Patent No.: US 10,459,294 B2
(45) Date of Patent: Oct. 29, 2019

(54) METHOD FOR ORIENTATION OF LIQUID CRYSTALS IN MICRO/NANO REGION ON BASIS OF LASER DIRECT WRITING AND SYSTEM THEREOF

(71) Applicant: NANKAI UNIVERSITY, Tianjin (CN)

(72) Inventors: Xinzheng Zhang, Tianjin (CN);
Jingjun Xu, Tianjin (CN); Wei Li, Tianjin (CN); Irena Drevensek-Olenik, Tianjin (CN); Wei Cui, Tianjin (CN);
Bin Shi, Tianjin (CN); Zhenhua Wang, Tianjin (CN); Qiang Wu, Tianjin (CN);
Yongfa Kong, Tianjin (CN)

(73) Assignee: NANKAI UNIVERSITY, Tianjin (CN)

( * ) Notice: Subject to any disclaimer, the term of this patent is extended or adjusted under 35 U.S.C. 154(b) by 667 days.

(21) Appl. No.: 15/035,392

(22) PCT Filed: Apr. 22, 2014

(86) PCT No.: PCT/CN2014/075876
§ 371 (c)(1),
(2) Date: May 9, 2016

(87) PCT Pub. No.: WO2015/139353
PCT Pub. Date: Sep. 24, 2015

(65) Prior Publication Data
US 2016/0291414 A1   Oct. 6, 2016

(30) Foreign Application Priority Data
Mar. 19, 2014 (CN) .......................... 2014 1 0108057

(51) Int. Cl.
*G02F 1/1337* (2006.01)
*B23K 26/352* (2014.01)
(Continued)

(52) U.S. Cl.
CPC .... *G02F 1/133788* (2013.01); *B23K 26/0006* (2013.01); *B23K 26/0624* (2015.10);
(Continued)

(58) Field of Classification Search
CPC ......... G02F 1/133788; G02F 1/133711; G02F 2001/133776; G02F 2202/023;
(Continued)

(56) References Cited

U.S. PATENT DOCUMENTS

| 5,770,826 A | 6/1998 | Chaudhari | |
|---|---|---|---|
| 2011/0234954 A1* | 9/2011 | Hsu | G02F 1/13 349/123 |

FOREIGN PATENT DOCUMENTS

| CN | 101131537 A | 2/2008 |
|---|---|---|
| CN | 101266313 A | 9/2008 |

(Continued)

OTHER PUBLICATIONS

"Local liquid crystal alignmnet on patterned micrograting structures photofabricated by two photon excitation direct laser writing", Appl. Phys. Lett. 93 173509 (2008). (Year: 2008).*
(Continued)

*Primary Examiner* — John A McPherson
(74) *Attorney, Agent, or Firm* — Craft Chu PLLC; Andrew W. Chu

(57) ABSTRACT

The method for orientation of liquid crystals in a micro/nano region on the basis of laser direct writing and a system thereof includes a laser direct writing system employed to build a micro/nano structure. Liquid crystal molecules in a micro/nano structural region perform self-orientation; and the orientation of liquid crystals is generated by fine structures on side walls of polymer strips which form the micro/nano structure. The dimension of the micro/nano region varies from the micrometer magnitude to the nanometer
(Continued)

magnitude exceeding the diffraction limit. The orientating direction can be adjusted and controlled in the micro/nano region, which is favorable for the miniaturization of the liquid crystal display devices and the orientation of the complicated three-dimensional liquid crystal structure.

6 Claims, 2 Drawing Sheets

(51) Int. Cl.
    *B23K 26/00*     (2014.01)
    *B23K 26/0622*     (2014.01)
    *G02F 1/1333*     (2006.01)
    *G02F 1/1341*     (2006.01)
    *B23K 26/359*     (2014.01)
    *B23K 101/36*     (2006.01)
    *B23K 103/00*     (2006.01)

(52) U.S. Cl.
    CPC .......... *B23K 26/355* (2018.08); *B23K 26/359* (2015.10); *G02F 1/1341* (2013.01); *G02F 1/133377* (2013.01); *G02F 1/133711* (2013.01); *B23K 2101/36* (2018.08); *B23K 2103/42* (2018.08); *B23K 2103/56* (2018.08); *G02F 2001/133776* (2013.01); *G02F 2202/023* (2013.01)

(58) Field of Classification Search
    CPC .... G03F 7/2053; G03F 7/70383; G03F 7/704; G03F 7/70025; G03F 7/0005; B23K 26/0006; B23K 26/0624; B23K 26/355; B23K 26/359; B23K 2101/36; B23K 2103/42
    USPC .................................................. 349/124, 127
    See application file for complete search history.

(56) References Cited

FOREIGN PATENT DOCUMENTS

| | | | |
|---|---|---|---|
| CN | 102837128 A | | 12/2012 |
| CN | 102998914 A | | 3/2013 |
| JP | 60-244928 A | * | 12/1985 |
| JP | 04372931 A | | 12/1992 |
| JP | 06-051314 A | * | 2/1994 |
| JP | 2008242147 A | | 10/2008 |
| KR | 200900295506 A | | 3/2009 |

OTHER PUBLICATIONS

"Uniform Lying Helix Alignment on Periodic Surface Reliel Structures Generated via Laser Scanning Lithography", Mo. Cryst. Liq. Cryst., vol. 544; pp. 37/[1025]-49[1037] (2011). (Year: 2011).*
Computer-generated translation of JP 60-051314 (Feb. 1994). (Year: 1994).*

* cited by examiner

METHOD FOR ORIENTATION OF LIQUID CRYSTALS IN MICRO/NANO REGION ON BASIS OF LASER DIRECT WRITING AND SYSTEM THEREOF

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention belongs to the technical field of light modulation technology, and specifically relates to the micro/nano processing field based on laser direct writing and light modulation based on liquid crystals, in particular to a method for the orientation of liquid crystals in a micro/nano region on the basis of laser direct writing and a system thereof.

2. Description of Related Art Including Information Disclosed Under 37 CFR 1.97 and 37 CFR 1.98.

Liquid crystal display (LCD) technology is applied to various products in the world, for example, watches, cellular telephones and computers. Upon estimation, the production value related to this industry is tens of billions USD every year.

In applications to display on the basis of liquid crystals and to other devices, orientation of the liquid crystals is always a key technique. A basic requirement for manufacturing the liquid crystal displays is the orientation of liquid crystal molecules (hereinafter referred to as "orientation layer") on a substrate surface (hereinafter referred to as "orientation surface"). Before forming of a liquid crystal box, liquid crystal molecules are placed on the orientation surface. A common method for generating this orientation surface is as follows: covering the substrate surface with a layer of film, for example, polyimide film, and then rubbing the film surface with a piece of polyester velvet. Through rubbing, the polyimide surface performs orientation again to form the orientation surface. The orientation surface provides an orientation cushion for the orientation of the liquid crystal molecules contacting the orientation surface.

In the recent thirty years, the rubbing method has become a main process for providing the orientation surface to the LCD. However, powder from the velvet is needed during the rubbing, and rubbing can generate static charges which damage the transistors below the polyimide surface, thus affecting the working performance of the modern LCD. Therefore, providing a method for forming the orientation surface without endangering the normal working of those transistors is very important. It is acknowledged in the industrial field that, for the future manufacturing engineering, a non-contact or a non-rubbing surface orientation method is a very urgent need for people.

An U.S. Pat. No. 5,770,826 granted to Chaudhari et al. discloses a non-contact method, namely changing the surface of a major type of materials by using low-energy electronic beams to cultivate the orientation for forming the orientation layer. Such orientation or the orientation order drives the liquid crystal molecules to perform directional alignment. Experience shows that LCD can be manufactured according to those inventions.

A strong thrust force in the liquid crystal display technology is improvement on the visual quality of the entire liquid crystal display. However, how to control the parallelism of the liquid crystals is unknown. Parallelism is a key factor for obtaining the homogeneity of the liquid crystal display. Chinese patent No. 01116589.8 "Method and Device for Forming Orientation Layer of Liquid Crystals" and Chinese patent No. 200510130415 "Method and Device for Forming Orientation Layer of Liquid Crystal Display" both study the orientation of the liquid crystals and achieve some progresses. But, they are applicable to the orientation of the liquid crystals in a small area, and inapplicable to the large area case.

Aiming at the orientation of the liquid crystals in a large area, mechanical methods are always employed in the existing liquid crystal industrial technologies and researches to form the orientation layer on the substrate surface to induce orientation of the liquid crystals. But, intrinsic defects and foreign matter pollution in the mechanical orientation method are key factors always affecting the orientation intensity and uniformity of the liquid crystals. To obtain quality orientation of the liquid crystals in a large area is always a technical problem to be broken through.

BRIEF SUMMARY OF THE INVENTION

To solve the above problems, aiming at the defects in the prior art, the present invention provides a method for the orientation of liquid crystals in a micro/nano area on the basis of laser direct writing and a laser direct writing system after making numerous designs and researches.

The present invention provides a method for the orientation of liquid crystals in a micro/nano region on the basis of laser direct writing; a laser direct writing system is employed to build a micro/nano structure; liquid crystal molecules in a micro/nano structural region perform self-orientation; the orientation of liquid crystals is generated by a fine structures on the side walls of polymer strips which form the micro/nano structure; and the dimension of the micro/nano region varies from the micrometer magnitude to the nanometer magnitude exceeding the super-diffraction limit.

The method for the orientation of liquid crystals in a micro/nano region on the basis of laser direct writing comprises the following steps of:

step 1, preparing substrate materials for processing the micro/nano structure;

step 2, building the micro/nano structure through laser direct writing;

step 3, post-processing the obtained micro/nano structure;

step 4, injecting liquid crystals into the built micro/nano structure to generate spontaneous orientation.

Wherein, the micro/nano structure processing is based on a single photon laser direct writing, or based on multi-photon laser direct writing.

Preferably, the fine structures on the side walls of said polymer strips are formed by single incident light; and said substrate materials are polymerizable organics.

Preferably, the liquid crystals are orientable nematic liquid crystals, cholesteric liquid crystals or chiral liquid crystals.

Furthermore, the micro/nano structure is a one-dimensional structure, two-dimensional structure or three-dimensional structure.

The present invention also provides a laser direct writing system using the method for the orientation of liquid crystals in a micro/nano region on the basis of laser direct writing, comprising a light generating system, a light beam parameter adjusting system, and a mechanical moving system; light beams generated by the light generating system are generated by the light beam parameter adjusting system to the light beams required to process the micro/nano structure, and the mechanical moving system drives the processed light beams and processed samples to generate relative displacement so as to process the micro/nano structure.

Preferably, the light generating system is a light beam generating system capable of motivating photopolymerization of the materials.

Furthermore, the optical parameter adjusting system is an optical device system which adjusts parameters such as the transmission direction, intensity and polarization of the light beams to ensure effective generation of the photopolymerization.

The method for the orientation of liquid crystals in a micro/nano region on the basis of laser direct writing of the present invention builds the micro/nano region through the single-photon or multi-photon polymerization laser direct writing and realizes self-orientation of the liquid crystals through the fine structures on the side walls of the micro/nano polymer strips. The operation is simple to operate. The fine structures for inducing the orientation of the liquid crystals are generated by the direct effect of a single beam of direct writing laser for processing the micro/nano structures and generated when the micro/nano structures are formed. For the micro/nano structure formed on this technology, the film for inducing the orientation of the liquid crystals is not needed, and it is also not needed to post-process the induction film by machining or other means such as photo induction. The liquid crystal molecules can directly contact the substrate to perform sensitive optical or electric regulation. And the orientation of the liquid crystal molecules can be controlled through structure building to fulfill the aim of complicated, and even random orientation. The method is favorable for development and wide popularization and application of various fine tuning photonic devices.

DETAILED DESCRIPTION OF THE INVENTION

The technical solution in embodiments of the present invention is clearly and completely described with reference to drawings in the embodiments of the present invention. Obviously, the described embodiments are only a part of embodiments in the present invention, not all the embodiments of the present invention. Based on the embodiments in the present invention, those ordinarily skilled in this field can obtain other embodiments without creative labor, which all shall fall within the protective scope of the present invention. Besides, the protective scope of the present invention cannot be regarded as limit in the following specific modules or specific parameters.

The present invention achieves stable orientation of the liquid crystal molecules in a tiny area, which is the precondition of realizing the control over the liquid crystal molecules and also the key technology of realizing the micro/nano photonic devices based on liquid crystal. Using the technology of the present invention, namely the photopolymerization-based laser direct writing, any three-dimensional micro/nano structures, even those exceeding the optical diffraction limit, can be built. The photonic liquid crystal display devices formed by injecting the liquid crystals in such micro/nano structures can realizes the photon control in a very tiny area.

To make those skilled in this field better understand the solution of the present invention, the present invention is further described in detail with reference to the attached drawings and implementation modes.

Figure 1:
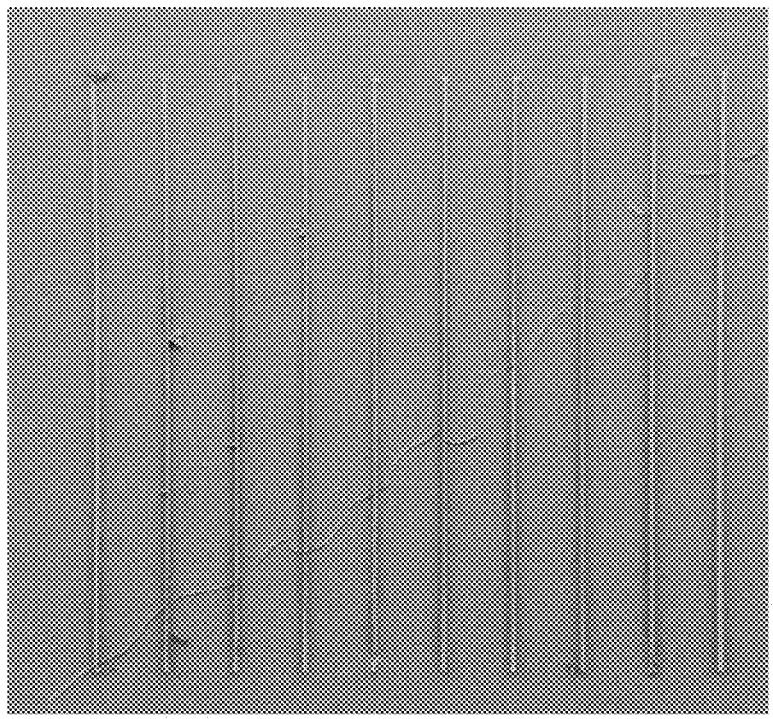
FIG. 1 is a photographic illustration of a micro/nano grid structure consisting of polymer strips manufactured using the method and system thereof of the present invention.

The present invention provides a method for the orientation of liquid crystals in a micro/nano region or structure 10 on the basis of laser direct writing. According to the method of the present invention, a laser direct writing system is employed to build a micro/nano structure. The micro/nano structure 10 includes a substrate 12 with a substrate plane 14, a plurality of polymer strips 16 arranged in parallel to each other in one direction (arrow 26) and perpendicular to the substrate plane so as to orient liquid crystal molecules 18. The micro/nano structure 10 allows liquid crystal molecules 18 to perform self-orientation. Each polymer strip has side walls 22. The orientation of liquid crystals is generated by fine structures 24 on the side walls of polymer strips which form the micro/nano structure; and the dimension of said micro/nano structure varies from the micrometer magnitude to the nanometer magnitude exceeding the diffraction limit. Essentially, the method uses a beam of a super-fast pulse laser to write in the micro/nano structures in materials capable of performing photopolymerization, and the basic structure element is polymer strips, as shown in FIG. 1. The materials have a threshold of photopolymerization, so the micro/nano structures exceeding the diffraction limit are manufactured; the processing mode can also be adjusted to form random three-dimensional structures.

Figure 2:
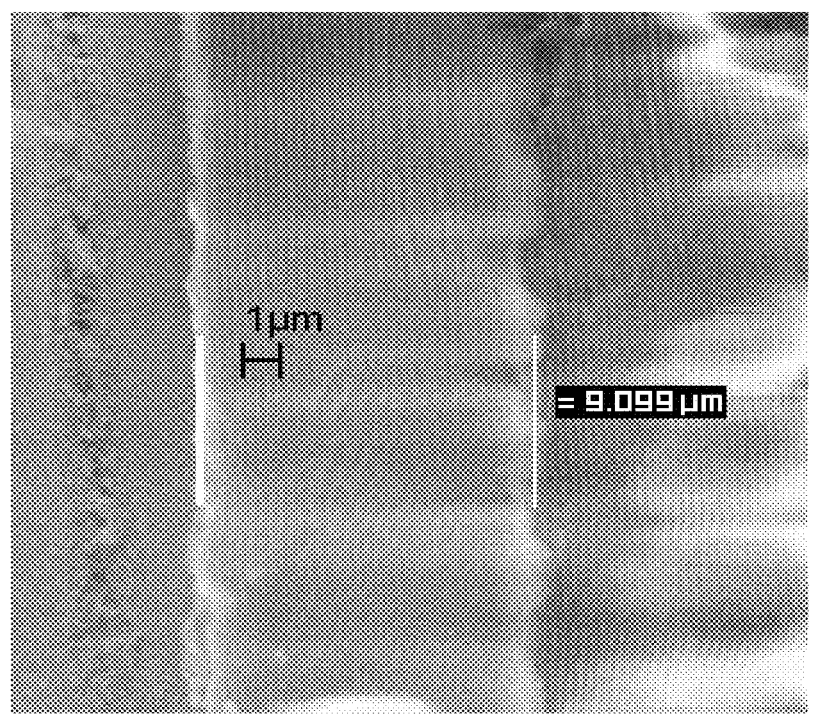
FIG. 2 is another photographic illustration of an amplified view of a lateral face of a polymer strip manufactured using the method and system thereof of the present invention.
Figure 3:
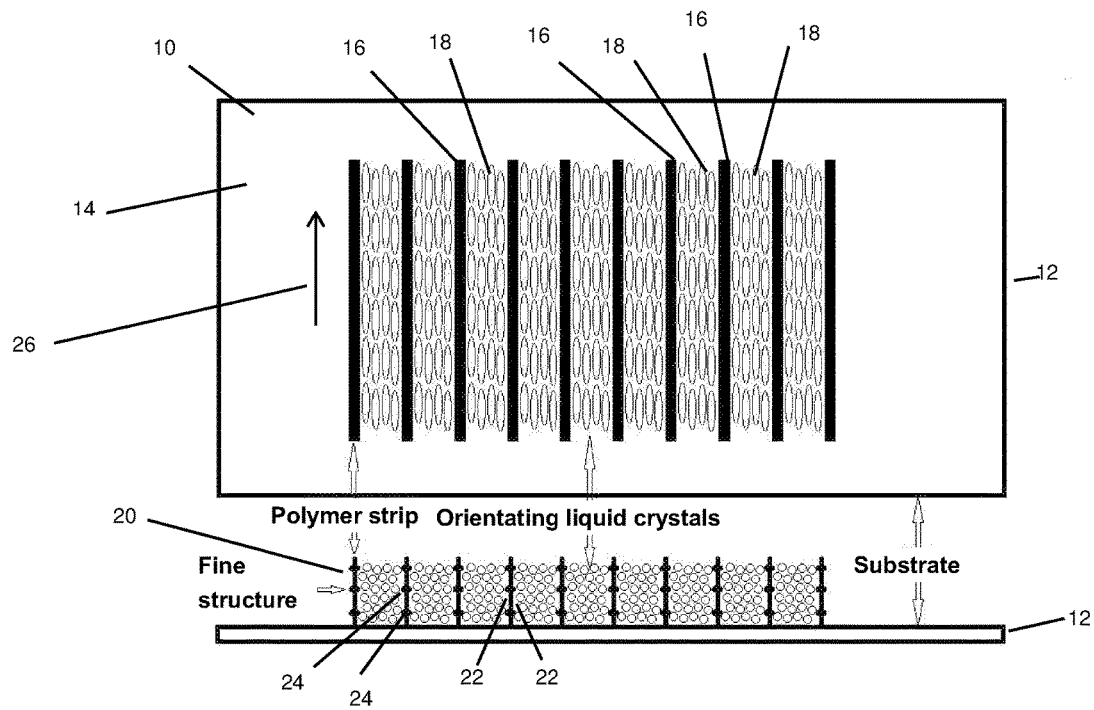
FIG. 3 is a schematic view of orientation of the liquid crystals caused by the fine structures on the polymer strips.

According to the present invention, based on the difference in the refractive index of the polymerization area, the non-polymerization area and the substrate, reflected light generated on the optical surface of the periphery of the polymerization area can interfere with the incident light to form stable patterns on the outside of the standing-wave re-molded polymerization area so as to generate the fine structures, as shown in FIG. 2. The fine structures can induce the orientation of the liquid crystal molecules injected therein without extra orientation means; the direction of the oriented molecules is vertical to the wave vector direction, but parallel to the direction of the polymer strips, as shown in FIG. 3.

The method for the orientation of liquid crystals in a micro/nano region on the basis of laser direct writing provided by the present invention comprises the following steps of:
   step 1, preparing substrate materials for processing the micro/nano structure, wherein the substrate materials are usually polymerizable organics, but are not limited to the polymerizable organics;
   step 2, building the micro/nano structure through laser direct writing;
   step 3, post-processing the obtained micro/nano structure;
   step 4, injecting liquid crystals into the built micro/nano structure to generate spontaneous orientation.

The present invention also provides a laser direct writing system using the method for the orientation of liquid crystals in a micro/nano region on the basis of laser direct writing, comprising a light generating system, a light beam parameter adjusting system, and a mechanical moving system; light beams generated by the light generating system are generated by the light beam parameter adjusting system to the light beams required to process the micro/nano structure, and the mechanical moving system drives the processed light beams and processed samples to generate relative displacement so as to process the micro/nano structure. The light generating system is a light beam generating system capable of motivating photopolymerization of the materials; the optical parameter adjusting system is an optical device system which adjusts parameters such as the transmission direction, intensity and polarization of the light beams to ensure effective generation of the photopolymerization.

The light generating system of the laser direct writing system, for example, a pulse laser device, generates a light beam, and the light beam is adjusted by the light beam parameter adjusting device consisting of optical devices such as a microprojector, a prism, a polarizing film, a wave plate, a lens or a microscope objective such that the parameters of the light beam, for example, the intensity, polarization, direction and dimension, meet the requirements for processing the micro/nano structure. A sample is placed at the processing position, and the processing light beam and the sample to be process are driven by using the mechanical moving system formed by devices like an electric control precise translation platform or a galvanometer to perform relative displacement so as to process the micro/nano structure.

Many test results show the processed samples can be pre-polymerized and cured and then processed in the processing system to form the micro/nano structure upon properties; next, the sample is developed, cured, rinsed and encapsulated; the encapsulated sample is injected with the liquid crystals to form the required devices.

The present invention is described in further detail with reference to the embodiments.

Embodiment 1

Figure 4:
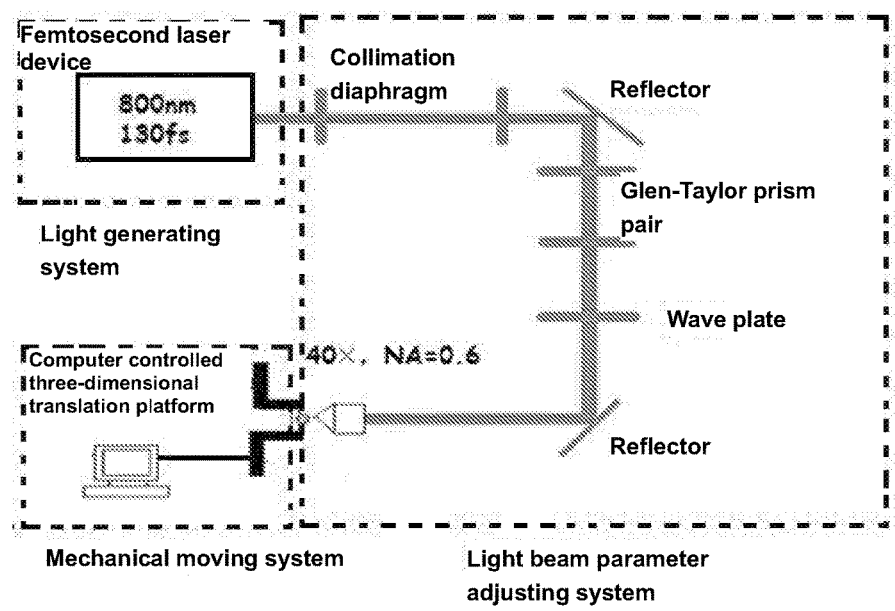
FIG. 4 is a schematic view of an optical diagram of a micro/nano region manufacturing system on the basis of the laser direct writing.

The present invention employs a bule-titanium sapphire femtosecond laser with a wavelength of 800 nm, a repetition frequency of 1,000 Hz and a pulse width of 130 femtoseconds, and uses a microobjective with an amplification factor of 40 and a numerical aperture of 0.6 for focusing to process one-dimensional grid structures on SU8 photoresist on a computer controlled precise three-dimensional translation platform. The specific optical diagram can be seen in FIG. 4. Then, the processed structure is developed, washed and next represented by using a scanning electron microscope, as shown in FIG. 1. Regular one-dimensional structures can be seen. The laid polymer strips are fine represented, as shown in FIG. 2, and fine strip structures along the processing direction and vertical to the optical wave vector direction can be seen. This grid structure is injected with isotropous E7 liquid crystals and then slowly cooled to the liquid crystal state. Excellent orientation effect can be observed by using the polarizing microscope, as shown in FIG. 3.

The method for orientation of the liquid crystals in a micro/nano region on the basis of laser direct writing and the system thereof provided by the present invention can realize the self-orientation of the liquid crystal molecules in the micro/nano region without preparation of the induction film; and, the method is easy to operate, universal, and suitable for manufacturing the liquid crystal micro/nano devices that perform self-orientation without induction film on laboratory conditions. Besides, the method for orientation of the liquid crystals in a micro/nano region on the basis of laser direct writing and the system thereof provided by the present invention can realize random orientation of the liquid crystals in micro/nano regions, over optical diffraction limiting regions, on the basis of the photopolymerization processing mode.

Furthermore, the method for orientation of the liquid crystals in a micro/nano region on the basis of laser direct writing and the system thereof provided by the present invention can realize the orientation of the liquid crystals in micro/nano regions, archiving the micro/nano crystallization of the orientating liquid crystals and helping implementation of the micro/nano photonic regulation and control. And, large-area micro/nano structures can be processed by means of arraying the lens assembly.

Preferably, the processing technology of the micro/nano structure is laser direct writing based on single-photon or multi-photon polymerization. The characteristic sizes of the micro/nano structures vary from the micrometer magnitude to the nanometer magnitude exceeding the diffraction limit. The liquid crystal molecules are nematic, cholesteric and chiral orientable liquid crystal materials. The processing materials in the micro/nano structures are random materials capable of generating photopolymerization, for example resin. In the present invention, the light generating system is preferably the titanium sapphire femtosecond laser, but is not limited to this laser. The mechanical moving system is preferably a computer controlled three-dimensional premise translation platform, but not limited to this platform.

From the technical solution provided by the present invention, it can be seen that the present invention discloses a method for orientation of liquid crystals in a micro/nano region on the basis of laser direct writing and a system thereof. The method is easy to operate, without manufacturing of the induction film for orientation on the substrate in advance; the orienting direction of the liquid crystals is determined by the fine structures, so complicated orientation in any direction within the face can be implemented, which is favorable for micromation and wide popularization and application of the liquid crystal based photonic devices.

The above embodiment is a preferred embodiment of the present invention, but the protective scope of the present invention is not limited to this embodiment. Any changes or substitutions that are easily made by those skilled in this field within the technical scope of the present invention shall fall within the protective scope of the present invention. Those ordinarily skilled in this field can understand that various modifications in forms and details can be made without departing from the spirit and scope of the present invention defined by the claims.

We claim:

1. A method for orientation of liquid crystals, the method comprising the steps of:
   preparing a sample being comprised of a substrate with a substrate plane and polymerizable organics spin-coated on said substrate;
   building a micro/nano structure,
   wherein said step of building said micro/nano structure comprises the steps of:
      laser direct writing said sample,
      wherein said step of laser direct writing comprises:
         continuously changing a position of a laser spot of a laser relative to said polymerizable organics; and
         polymerizing a portion of said polymerizable organics consistent with movement trajectory of said laser spot so as to form a plurality of polymer strips arranged in parallel to each other in one direction and perpendicular to said substrate plane, each polymer strip having side walls, and so as to form polymerized and unpolymerized portions on said substrate; and
      removing said unpolymerized portions so as to form said micro/nano structure with fine structures on respective side walls of said polymer strips, wherein height of each polymer strip is greater than 2.0 microns; and
   injecting liquid crystals into said micro/nano structure with fine structures so as to perform self-orientation of said liquid crystals parallel to said one direction of said polymer strips, said liquid crystals separating into a plurality of liquid crystal portions between adjacent polymer strips, each liquid crystal portion being separate from each other.

2. The method for the orientation of liquid crystals, according to claim 1, wherein the step of laser direct writing is comprised of a single photon laser direct writing.

3. The method for the orientation of liquid crystals, according to claim 2, wherein said fine structures on respective side walls of said polymer strips are formed by single incident light.

4. The method for the orientation of liquid crystals, according to claim 1, wherein the step of said laser direct writing is comprised of multi-photon laser direct writing.

5. The method for the orientation of liquid crystals, according to claim 1, wherein said liquid crystals are selected from a group consisting of: orientable nematic liquid crystals, cholesteric liquid crystals and chiral liquid crystals.

6. The method for the orientation of liquid crystals, according to claim 1, wherein said micro/nano structure is selected from a group consisting of: a one-dimensional structure, a two-dimensional structure, and a three-dimensional structure.

* * * * *